United States Patent
Jayaraman et al.

(10) Patent No.: US 11,880,435 B2
(45) Date of Patent: Jan. 23, 2024

(54) DETERMINATION OF INTERMEDIATE REPRESENTATIONS OF DISCOVERED DOCUMENT STRUCTURES

(71) Applicant: ServiceNow, Inc., Santa Clara, CA (US)

(72) Inventors: Baskar Jayaraman, Fremont, CA (US); ChitraBharathi Ganapathy, San Jose, CA (US); Tao Hong, San Jose, CA (US); Rohit Lobo, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 547 days.

(21) Appl. No.: 17/167,316

(22) Filed: Feb. 4, 2021

(65) Prior Publication Data

US 2021/0256097 A1    Aug. 19, 2021

Related U.S. Application Data

(60) Provisional application No. 62/975,477, filed on Feb. 12, 2020.

(51) Int. Cl.
| | |
|---|---|
| *G06N 20/00* | (2019.01) |
| *G06F 21/10* | (2013.01) |
| *G06F 16/25* | (2019.01) |
| *G06F 40/295* | (2020.01) |
| *G06N 3/08* | (2023.01) |
| *G06V 30/413* | (2022.01) |
| *G06V 30/416* | (2022.01) |

(52) U.S. Cl.
CPC .......... *G06F 21/105* (2013.01); *G06F 16/258* (2019.01); *G06F 40/295* (2020.01); *G06N 3/08* (2013.01); *G06V 30/413* (2022.01); *G06V 30/416* (2022.01)

(58) Field of Classification Search
None
See application file for complete search history.

(56) References Cited

U.S. PATENT DOCUMENTS

| | | | |
|---|---|---|---|
| 10,846,341 B2* | 11/2020 | Cerino | G06F 16/285 |
| 11,379,435 B2* | 7/2022 | Seth | G06F 16/2455 |
| 11,386,685 B2* | 7/2022 | Kaynig-Fittkau | G06V 10/82 |

(Continued)

OTHER PUBLICATIONS

Ren et al., "Faster R-CNN: Towards Real-Time Object Detection with Region Proposal Networks", Jan. 6, 2016.

*Primary Examiner* — Joseph P Hirl
*Assistant Examiner* — Hassan Saadoun
(74) *Attorney, Agent, or Firm* — Van Pelt, Yi & James LLP

(57) ABSTRACT

A document is received. The document is analyzed to discover text and structures of content included in the document. A result of the analysis is used to determine intermediate text representations of segments of the content included in the document, wherein at least one of the intermediate text representations includes an added text encoding the discovered structure of the corresponding content segment within a structural layout of the document. The intermediate text representations are used as an input to a machine learning model to extract information of interest in the document. One or more structured records of the extracted information of interest are created.

20 Claims, 6 Drawing Sheets

(56) References Cited

U.S. PATENT DOCUMENTS

| | | | |
|---|---|---|---|
| 2012/0179718 A1* | 7/2012 | Matsumoto | G06F 16/38 |
| | | | 707/758 |
| 2020/0050848 A1* | 2/2020 | Wyle | G06V 30/416 |
| 2020/0175095 A1* | 6/2020 | Morariu | G06N 3/045 |
| 2020/0226364 A1* | 7/2020 | Gehler | G06Q 50/14 |
| 2021/0232934 A1* | 7/2021 | Lai | G06N 3/126 |
| 2021/0240787 A1* | 8/2021 | Miguel | G06Q 40/12 |

* cited by examiner

DETERMINATION OF INTERMEDIATE REPRESENTATIONS OF DISCOVERED DOCUMENT STRUCTURES

CROSS REFERENCE TO OTHER APPLICATIONS

This application claims priority to U.S. Provisional Patent Application No. 62/975,477 entitled SOFTWARE ENTITLEMENT EXTRACTION FROM UNSTRUCTURED CONTRACT DOCUMENTS filed Feb. 12, 2020 which is incorporated herein by reference for all purposes.

BACKGROUND OF THE INVENTION

Documents are written, drawn, or otherwise presented representations of thought. Documents can appear in physical form, for example, printed on paper. Documents can also appear in electronic form in which document text and structures can be encoded, stored, and presented in various file formats. In some scenarios, a document exists in electronic form as a digital image, which can then be converted to a file format that encodes document text and structures by using electronic optical character recognition (OCR). Documents in physical form need to be analyzed manually by a human in order to extract information of interest; whereas, content extraction can be performed automatically using computer analysis of documents in electronic form. Thus, it would be beneficial to develop techniques directed toward improving automated computer analysis of electronic documents for content extraction.

BRIEF DESCRIPTION OF THE DRAWINGS

Various embodiments of the invention are disclosed in the following detailed description and the accompanying drawings.

DETAILED DESCRIPTION

Figure 1:
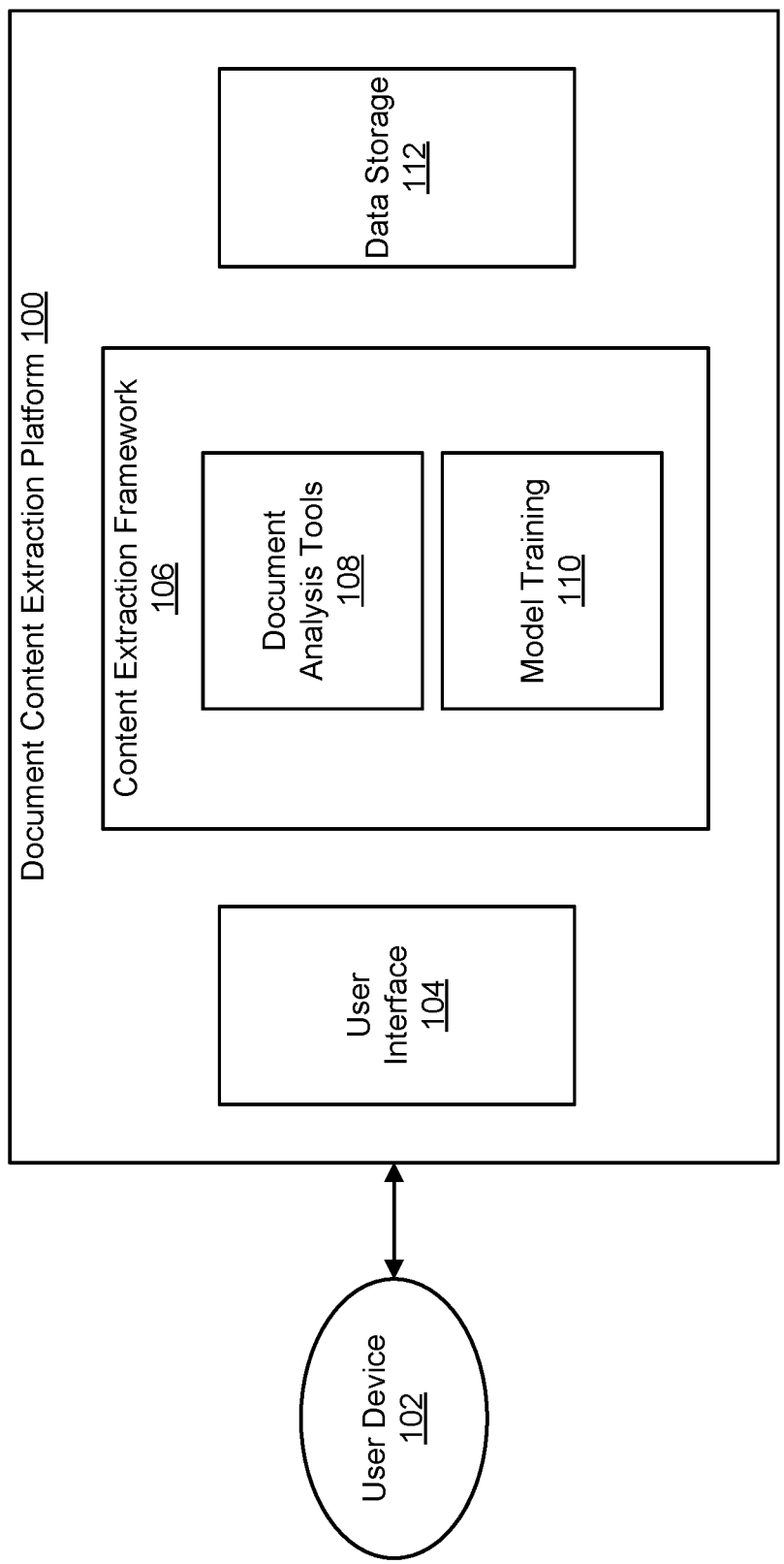
FIG. 1 is a block diagram illustrating an embodiment of a system for extracting content from documents.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A document is received. The document is analyzed to discover text and structures of content included in the document. A result of the analysis is used to determine intermediate text representations of segments of the content included in the document, wherein at least one of the intermediate text representations includes an added text encoding the discovered structure of the corresponding content segment within a structural layout of the document. The intermediate text representations are used as an input to a machine learning model to extract information of interest in the document. One or more structured records of the extracted information of interest are created. A practical and technological benefit of the techniques disclosed herein is more accurate and efficient extraction of electronic document content by a computer. For example, various technological problems are solved in the context of automated license information extraction from electronic contract documents. In many contracts, important license information is stored in tables (as opposed to block text). Prior approaches are deficient because automated computer analysis of tables in documents has been error-prone, resulting in inaccurate extraction of relevant content from such tables. The techniques disclosed herein improve computer analysis of table structures and thus automated extraction of table content by a computer. For example, as described in further detail herein, converting table structures to intermediate text representations and providing these intermediate text representations to a machine learning model improve accuracy of automated computer extraction of content from tables in electronic documents.

In various embodiments, software licensing contracts are analyzed by a computer to determine relevant license terms and the license terms are stored in a database. Stated alternatively, entitlement creation for software asset management (SAM) is performed. SAM refers to documenting and managing software assets (e.g., software licenses). SAM tools can be used to track local, on-premises software licenses as well as software-as-a-service assets. SAM software is used for a variety of reasons, including cost tracking, contract management and compliance, and license management. Without the automated techniques disclosed herein, a user would need to manually go through contracts and related documents and input the relevant licensing information to be persisted in a SAM backend database. In various embodiments, using the techniques disclosed herein, software license information is automatically extracted, including by utilizing a machine learning framework, to reduce effort required to manually create and maintain software licensing information in a SAM database. In some embodiments, the user imports one or more contract documents from which licensing information needs to extracted, the imported documents are passed to a content extraction platform, text document structures such as tables are scanned, and licensing information is extracted into a structured format.

FIG. 1 is a block diagram illustrating an embodiment of a system for extracting content from documents. In the example shown, document content extraction platform 100 is communicatively connected to user device 102 and includes user interface 104, content extraction framework 106, and data storage 112. In various embodiments, user device 102 provides electronic documents to document content extraction platform 100. In various embodiments, the documents are contracts (e.g., software contracts). Stated alternatively, in various embodiments, the documents are agreements in which contractual rights of software are transferred (e.g., sold and/or licensed). Other examples of documents include invoices, purchase orders, employment letters, and other legal and financial documents. The documents oftentimes do not follow a standard format or length. The documents can be extremely lengthy (e.g., hundreds of pages), which would require substantial manual effort to analyze to extract licensing information. Thus, it would be beneficial to have a computer automatically extract the license information. In various embodiments, the extracted information is stored in a SAM database. The documents can include text, tables, charts, images, and other document structures. Documents can be provided in various input file formats. An example input file format is a word processing format such as DOC (Microsoft Word document). Another example is a file format that has captured all the elements of a printed document as an electronic image that a user can view, navigate, print, and/or send/forward to another user (a portable format), such as PDF (portable document format). Other examples of file formats include RTF (rich text document), various plain text document formats (e.g., ASC and TXT formats), variants of the DOC format (e.g., DOCX), TeX, and other document formats. In some scenarios, documents or parts thereof are comprised of images that include text. Examples of image formats include JPEG (joint photographic experts group), GIF (graphics interchange format), BMP (bitmap image), TIFF, PNG (portable network graphics), and other image formats. Typically, OCR is utilized to convert text in images to a format that is readable and searchable by a computer.

Examples of user device 102 include a laptop computer, a desktop computer, a smartphone, a tablet, and other computing devices. In various embodiments, user device 102 is communicatively connected to document content extraction platform 100 via a network (not shown in FIG. 1). Examples of a network include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, document content and extraction platform 100 is comprised of one or more computers or other hardware components configured to provide document analysis and content extraction functionality. In various embodiments, one or more processors execute computer program instructions for analyzing documents to discover text and structures, running machine learning models, and creating structured records of information extracted from documents. In various embodiments, document content extraction platform 100 includes data storage hardware to store the structured records.

In the example shown, document and content extraction platform 100 includes user interface 104, content extraction framework 106, and data storage 112. In some embodiments, user interface 104 is a software interface. User interface 104 receives input documents from user device 102 and transmits the received documents to content extraction framework 106. User interface 104 also handles requests from user device 102 to retrieve information stored in data storage 112.

In the example shown, content extraction framework 106 includes document analysis tools 108 and model training 110. Document analysis tools 108 includes software configured to analyze received documents to discover text and structures of content included in the documents, determine representations (e.g., text representations) of the discovered text and structures, and extract content from the received documents. In various embodiments, document analysis tools 108 includes one or more machine learning models configured to extract entities included in the documents. As used herein, entities refer to data of distinct types located within documents. Entities are information of interest that are extracted and stored (e.g., stored in data storage 112). Examples of entities (e.g., for software contracts) include: product, publisher part number, publisher, version, edition, platform, language, agreement type, license type, purchased rights, unit cost currency, unit cost, metric group, license metric, license duration, rights per license pack, number of packs, start date, end date, named user type, database option, purchase order number, asset tag, owned by, company, location, vendor, general ledger account, cost center, department, and contract number. Further description of these entities is given herein.

Model training 110 includes software configured to train machine learning models utilized to analyze documents and extract entities. In some embodiments, the machine learning models are included in document analysis tools 108. In some embodiments, documents are analyzed by document analysis tools 108 and results of the analysis are used to determine intermediate text representations of segments of content that are used as training instances provided to model training 110. The trained machine learning models can be utilized in inference mode to extract information of interest in documents provided to content extraction framework 106. Machine learning model training is described in further detail herein.

In various embodiments, outputs of content extraction framework 106 are stored in data storage 112. In various embodiments, the outputs include extracted entities (e.g., see examples of entities above) that are in a specified data format, such as JSON (JavaScript Object Notation). In various embodiments, data storage 112 includes computer hardware configured to store outputs of content extraction framework 106. Examples of computer hardware for storing such outputs include hard disk drives and solid-state drives. User interface 104 is also configured to receive requests from user device 102 to access and retrieve data stored in data storage 112. User interface 104 is able to transfer data from data storage 112 to user device 102. In the example shown, data storage 112 is included within document content extraction platform 100. It is also possible for data storage 112 to be separate from but communicatively connected to document content extraction platform 100. In various embodiments, data storage 112 is part of a SAM system.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. Components not shown in FIG. 1 may also exist.

Figure 2:
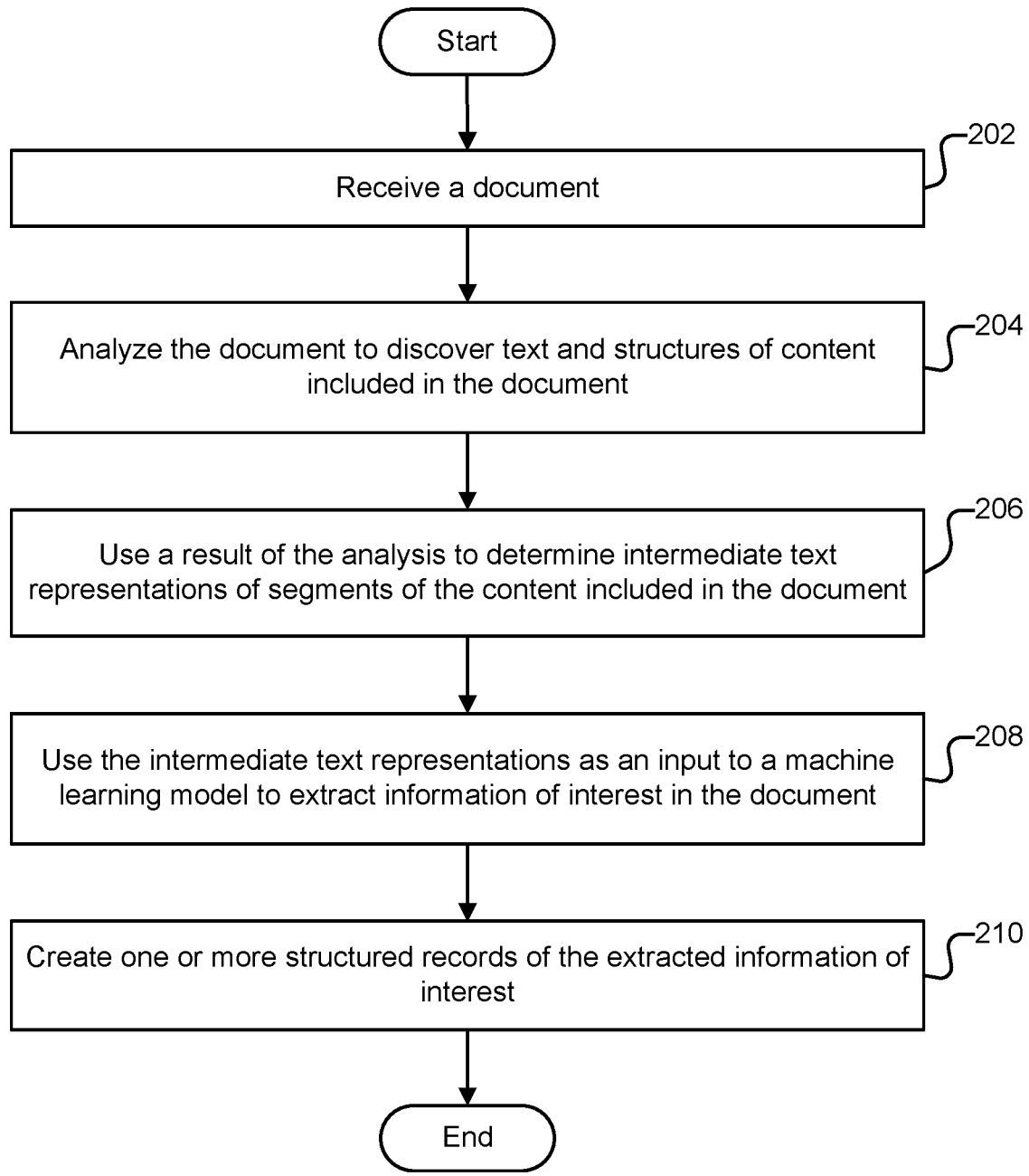
FIG. 2 is a flow chart illustrating an embodiment of a process for determining and using intermediate representations of content segments.

FIG. 2 is a flow chart illustrating an embodiment of a process for determining and using intermediate representations of content segments. In some embodiments, the process of FIG. 2 is performed by document content extraction platform 100 of FIG. 1.

At 202, a document is received. In some embodiments, the document is received by content extraction framework 106 of FIG. 1. For example, the document may be provided by user device 102 of FIG. 1 via user interface 104 of FIG. 1 and passed to content extraction framework 106 of FIG. 1. Examples of documents include contracts, invoices, purchase orders, employment letters, and other legal and financial documents. In some embodiments, the document is a software contract, such as a software license agreement.

At 204, the document is analyzed to discover text and structures of content included in the document. In some embodiments, the document is analyzed by document analysis tools 108 of FIG. 1. In some embodiments, preprocessing of the document is performed, e.g., checking for document type (e.g., DOC format versus PDF) and performing document type specific processing to prepare the document for analysis. Document preprocessing is described in further detail herein (e.g., see FIG. 3). In various embodiments, document text and table structures are extracted. In many scenarios, document text appears in paragraphs or blocks. Text is comprised of words, typically in sentence form. As used herein, a table refers to an arrangement of information in rows and columns comprising cells. Presenting information in a table structure/format typically makes comparing and contrasting the information easier for a reader. In some embodiments, one or more machine learning models, are utilized to discover table structures. Rules-based approaches to table discovery may also be utilized and/or combined with machine learning model approaches. Document analysis and content discovery are described in further detail herein (e.g., see FIG. 3). After text and other structures of content (e.g., tables) are discovered, content that is not relevant is discarded. Oftentimes, many pages in the document do not have relevant information. For example, a software contract may have tens of pages (or even a hundred pages), of which only a few pages (e.g., in one or a few paragraphs of text and/or in one or a few tables) include relevant software licensing information. In some embodiments, a filtering model determines whether each block of text, table portion, and so forth includes relevant content. Identifying relevant content is described in further detail herein (e.g., see FIG. 3).

At 206, a result of the analysis is used to determine intermediate text representations of segments of the content included in the document. In some embodiments, the intermediate text representations correspond to table rows. In some embodiments, at least one of the intermediate text representations includes an added text encoding the discovered structure of the corresponding content segment within a structural layout of the document. For example, for a structural layout that is a table, the added text can be column labels of the table. In some embodiments, the intermediate text representations are, for each row of a table, a first column label, table content corresponding to the first column label, a second column label, table content corresponding to the second column label, and so forth for each pair of column label and corresponding content in the table row. Table data is enriched by reading tables and converting table structures into sequences of text.

At 208, the intermediate text representations are used as an input to a machine learning model to extract information of interest in the document. In some embodiments, the machine learning model is a named-entity recognition (NER) model. As used herein, NER (also known as entity identification or entity extraction) refers to a natural language processing (NLP) technique that automatically identifies named entities in a text and classifies them into predefined categories, wherein such named entities can be names of people, organizations, locations, times, quantities, monetary values, percentages, etc. Stated alternatively, NER is an information extraction technique that seeks to locate and classify named entities mentioned in unstructured text into pre-defined categories. In various embodiments, these named entities are the information of interest and include one or more of the entities described below.

With respect to the example of software contract documents, examples of entities that may be extracted include: product (software name/title for which rights are purchased), publisher part number (part number of the software title for which rights are purchased), publisher (company that manufactures the software title), version (version of the software title that is purchased), edition (edition of the software title that is purchased), platform (platform on which the software title can run), language (language in which the software title can be viewed), agreement type (type of contract that was signed for the software title), license type (license information, such as whether the license is a full license or an upgrade license based on a previous version or edition), purchased rights (number or quantity of use rights purchased for the software title), unit cost currency (currency used to purchase the software title), unit cost (cost for a single right, e.g., a single license, of the software title), metric group (license metric used to calculate license compliance), license metric (calculation by which license compliance is determined for the software title), license duration (length of subscription term for the software title), rights per license pack (how many licenses are included in each pack when licenses are being purchased in license packs), number of packs (how many license packs are being purchased when licenses are being purchased in license packs), start date (date that use rights for the software title start), end date (date that use rights for the software title end), purchase order number (purchase order number under which the software title is purchased), asset tag (unique identifier for the software title), owned by (employee that has ownership of the software title), company (company or subsidiary to which the software title belongs), location (location, e.g., country, in which the software title can be used), vendor (company from which the software title is procured), general ledger account (account number under which the financial transaction for the software title is reported), cost center (department to which the cost of the software title is charged), department (department that maintains ownership of the software title), and contract number (contract number on which the software title is purchased). As used herein, a license (e.g., a software license) refers to a permission granted by a qualified authority permitting a licensee to do something (e.g., use the software title) that would otherwise be prohibited. The license is typically granted to the licensee in exchange for payment from the licensee.

In some embodiments, an extracted entity is linked to a standard name for that entity. For example, an extracted product name can be one of several variants for a standard form of a product name. In addition, standard currency code lists and pricing numeric formats can be used for extracted pricing information. Date formats along with specified rules can be used to extract license duration and start and end dates. Specific regular expression (RegEx) lists can be used for each entity of interest that is to be extracted from a document. Thus, an extracted value of a specified entity type may be transformed to a standardized version. A non-standard version of a standardized name can be detected based on comparing the non-standard version and the standard version and determining that the two are within a specified distance of each other (e.g., within a specified Levenshtein distance, cosine distance, or another type of distance metric).

In some embodiments, an intermediate text representation (e.g., a text sequence) of a row of table content is an instance of an input to a machine learning model from which entities are extracted. An advantage of the intermediate text representation is that content structured in different ways (e.g., in different table formats) and in different document types (e.g., DOCs, PDFs, etc.) can be converted into a standardized format. This standardized format is advantageous for training the machine learning model that performs entity extraction because training examples with the various content structures (e.g., different table formats) and from the various document types can be pooled together to train the machine learning model instead of training separate machine learning models tailored to differently formatted training examples. Being able to provide more training examples to the machine learning model accelerates machine learning model training and increases accuracy of the machine learning model in inference mode.

In some embodiments, an intermediate text representation for each row of information from a table comprises a training instance for an NER model. Thus, the NER model accepts a text only input. In various embodiments, the text is formatted to have layout information (e.g., see FIG. 4 description of the example of FIG. 5). Words in the text can be comprised of letters, numerals, or both. Many words are not natural language. For example, product names are oftentimes alphanumeric strings with no natural language meaning. In various embodiments, the NER model converts input text to words and uses the words as features. In addition to words, additional features can be provided to the NER model. Examples of additional features include word prefix (e.g., first three characters of each word), word suffix (e.g., last three characters of each word), and data type (e.g., whether the word is alphabetic (just letter characters), numeric (just numbers), or alphanumeric (both letters and numbers)). Thus, in some embodiments, the NER model utilizes four features (word, prefix, suffix, data type) to create an embedding. This example is illustrative and not restrictive. Other features associated with words may also be chosen and utilized in the model. In various embodiments, a deep learning model utilizes a single representation (e.g., single vector) that combines the features. In some embodiments, the deep learning model includes a sequence layer for each entity (e.g., product name) because the entity can be comprised of multiple words (e.g., multiple words in a product name).

At 210, one or more structured records of the extracted information of interest are created. In various embodiments, the extracted information of interest includes extracted entities and corresponding labels for the extracted entities. For example, "Product=OfficeProPlus" (indicating that a product called "OfficeProPlus") could be an example of information stored in a record. Additional information related to the product (e.g., publisher, cost, license type, etc.) would also be stored in the same record. In some embodiments, the structured records are stored in data storage 112 of FIG. 1. The structured records can be viewed by a user, e.g., provided through user interface 104 of FIG. 1. In various embodiments, the structured records store key/value pairs corresponding to entities extracted from document blocks. Row and column level information from tables are utilized to build a structured row from extracted key/value pairs. Row level identifiers that map the source table text corresponding to each structured row can also be stored, allowing for tracing back to the row level data in the source document.

In some embodiments, user-driven feedback is incorporated into the process of FIG. 2. For example, if a user edits or adds to a product name (or any entity that is identified), training for a machine learning model can be re-run using the updated product name. Any addition/deletion/correction made to structured records can be utilized as feedback to an NER model and for document preprocessing. Additionally, the user can also manually mark text blocks and tables as relevant or irrelevant, which can be used to improve multi-label classification used in relevance detection.

Figure 3:
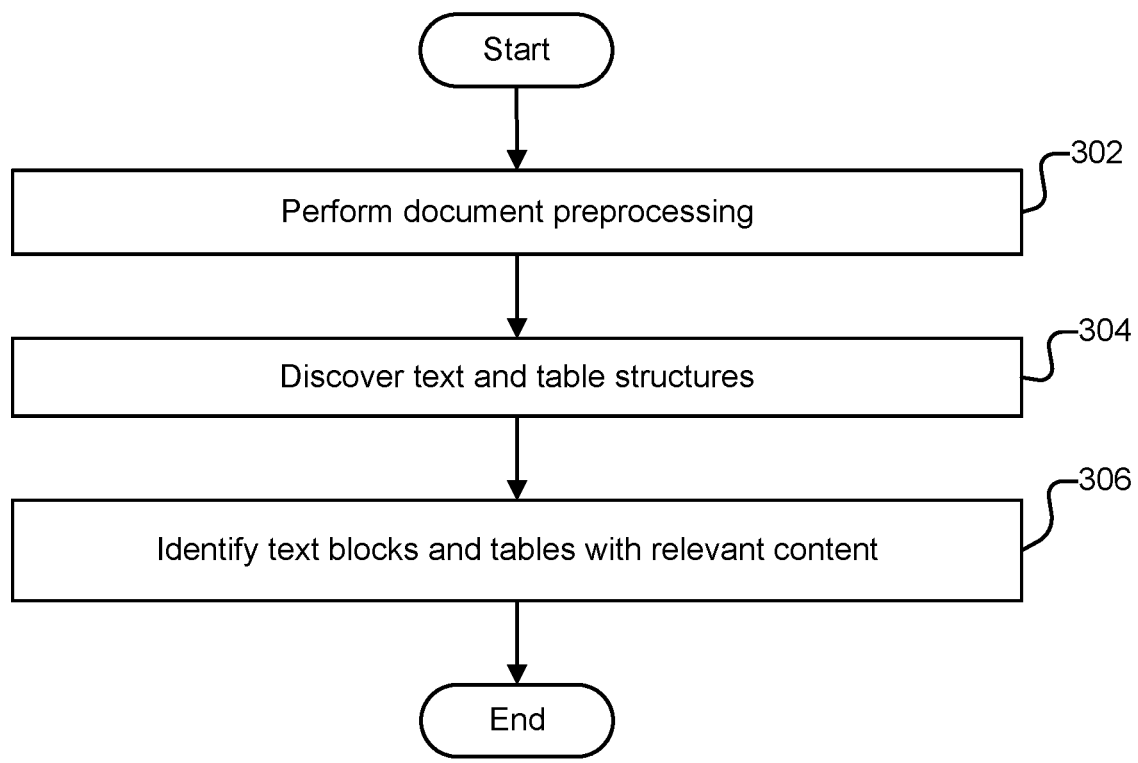
FIG. 3 is a flow chart illustrating an embodiment of a process for discovering document text and structures.

FIG. 3 is a flow chart illustrating an embodiment of a process for discovering document text and structures. In some embodiments, the process of FIG. 3 is performed by document analysis tools 108 of FIG. 1. In some embodiments, at least a portion of the process of FIG. 3 is performed in 204 of FIG. 2.

At 302, document preprocessing is performed. Document type (e.g., DOC format versus PDF) and document properties are checked and document type specific processing is performed to prepare the document for analysis. Preprocessing is needed because multiple types of documents are accepted (e.g., PDF, Microsoft Word documents, image-based PDFs, and scanned image documents). Preprocessing standardizes documents so that they can be analyzed for content in a similar manner. OCR is performed on image documents to create text for further analysis. Image documents are also preprocessed using various image processing techniques (e.g., grayscaling to convert various color schemes to a grayscale scheme, normalization to change the range of pixel values to improve contrast, etc.). PDF documents are checked for common errors (e.g., corrupted file errors) and corrected.

At 304, text and table structures are discovered. Text and table structure discovery procedures are based at least in part on document structure. With respect to the example of software contracts, received documents are often unstructured and also vary in length. Relevant information may be present in text paragraphs, table structures, or both. For example, a product list along with quantity and price information are oftentimes presented in a tabular fashion in many software licensing contracts. Thus, ultimately, content extraction needs to account for pulling a potentially small amount of relevant information out of a large document from different document layout elements.

In various embodiments, one or more machine learning models are utilized to detect table structures. As used herein, machine learning model refers to an automated prediction mechanism or procedure (e.g., in computer code form) that results from training the automated prediction mechanism on manually provided training data. Training the automated prediction mechanism comprises iteratively tuning and adjusting the prediction mechanism (e.g., rules, algorithms, etc.) so that outputs of the prediction mechanism (the prediction outputs) fit the known, correct outputs associated with the training data. Mappings between training data inputs and outputs are known a priori, e.g., because they are determined through human review. Stated alternatively, a machine learning model represents what is learned by a machine learning algorithm (a procedure applied to input data to arrive at an output prediction) after the machine learning algorithm is tuned according to training data. A trained machine learning model can be utilized to generate outputs associated with input data whose true, correct outputs are not known a priori, which is referred to as utilizing the machine learning model in inference mode (as opposed to training mode when the machine learning model is tuned based on training data).

In various embodiments, table boundaries are detected using a machine learning model. In some embodiments, the table boundary detection machine learning model is a fast region-based convolutional neural network (Fast R-CNN). The Fast R-CNN outputs table boundaries and provides coordinates in the document where a given table is found. After coordinates of the table are determined, text within the table can be read in order to extract table contents. In some embodiments, a rules-based system is utilized to read table contents after table boundaries are determined. For example, the rules-based system may categorize a first text in the table as a header, a first row of cells as column labels, and subsequent rows of cells as table data. A machine learning model or a rules-based system may rely on text within each cell being clustered together and utilize a space metric to determine where table cells are located. Distances between clusters of text are determined and each cluster of text is identified as a cell if it is at least a specified distance from another cluster of text. In various embodiments, table content (e.g., header, column labels, and text in other table cells) are extracted into a text format that removes spatial distance information between text clusters, such as a comma-separated values (CSV) format. In a CSV format, values are separated by separator characters, including but not limited to commas. This text format is advantageous because NLP and other text processing techniques can be readily applied.

A machine learning model (e.g., a Fast R-CNN model) may be utilized to detect text blocks in documents. Text blocks may also be detected according to a rules-based approach (e.g., a paragraph of text can be designated as a text block). In some embodiments, text blocks are processed using NLP techniques (e.g., sentence tokenization, cleanup, etc.). In various embodiments, each text block and table structure that is detected in a document is tagged with a unique identifier to keep track of the detected text blocks and tables. Each text block may be a paragraph of text. It is also possible to designate other units of text information (e.g., a column, a specified number of lines, a page, etc.) as a block of text.

At 306, text blocks and tables with relevant content are identified. For each text block and table that is discovered (e.g., at 304 above), analysis is performed to determine whether they have relevant content. In the example of documents that are software contracts, determining whether there is relevant content includes determining if there is software licensing related information, such as information related to a product, publisher part number, publisher, version, edition, platform, language, agreement type, license type, purchased rights, unit cost currency, unit cost, metric group, license metric, license duration, rights per license pack, number of packs, start date, end date, named user type, database option, purchase order number, asset tag, owned by, company, location, vendor, general ledger account, cost center, department, contract number, or another entity to be extracted. In some embodiments, a machine learning model is utilized to classify whether a text block, table, or other portion of a document (e.g., a page that could include multiple text blocks, tables, and/or text blocks and tables) has relevant information. In some embodiments, the machine learning model is a multilabel classification model. The labels in the classification model correspond to the entities that are to be extracted (examples listed above) from the document. Each text block, table, or page could be classified with more than one label based on the entities detected in the text in that part of the document. In various embodiments, all text blocks and tables that are identified to have relevant entities are tagged and passed on for further processing.

Figure 4:
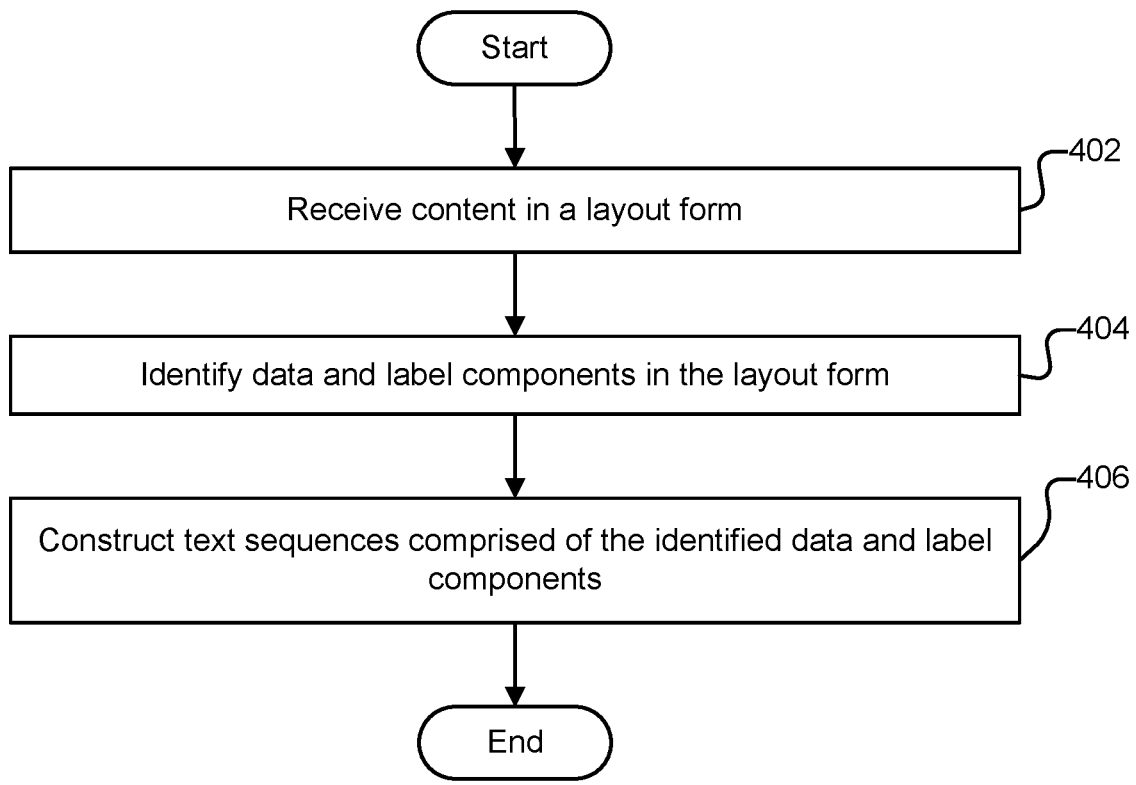
FIG. 4 is a flow chart illustrating an embodiment of a process for determining intermediate text representations.

FIG. 4 is a flow chart illustrating an embodiment of a process for determining intermediate text representations. In some embodiments, the process of FIG. 4 is performed by document analysis tools 108 of FIG. 1. In some embodiments, at least a portion of the process of FIG. 4 is performed in 206 of FIG. 2.

Figure 5:
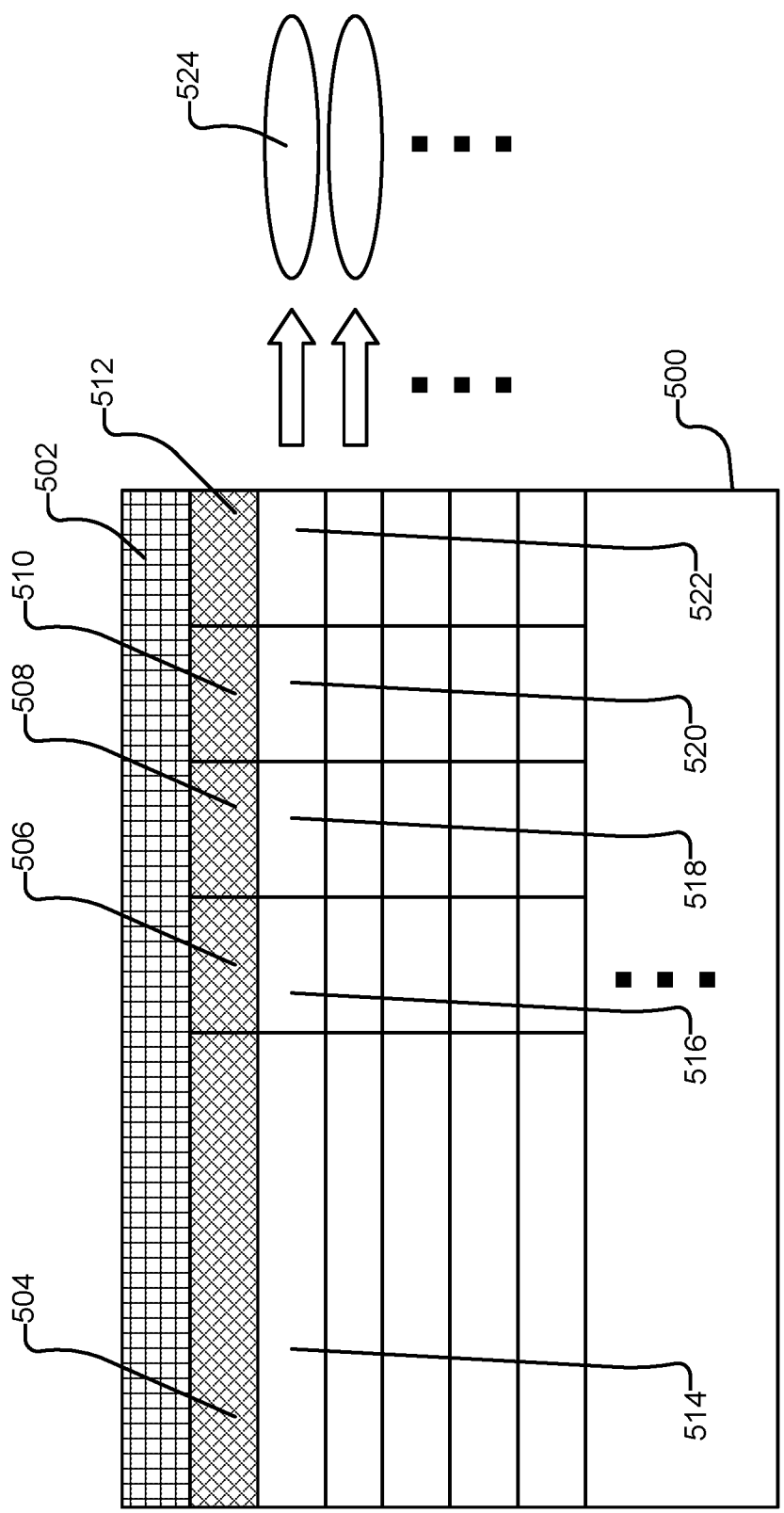
FIG. 5 is a diagram illustrating an example of converting table content segments to intermediate representations.

At 402, content is received in a layout form. In some embodiments, the layout form is derived from a table structure. For example, content may be received in a CSV format that includes table header, column label, and content information extracted from a table. Table 500 of FIG. 5 is an example of a table structure from which a layout form can be derived. In the example of FIG. 5, table 500 is comprised of table header 502, column labels 504, 506, 508, 510, and 512, and multiple rows of table information content. The first row of information content in table 500 is comprised of cells 514, 516, 518, 520, and 522. In some embodiments, a CSV format for table 500 comprises: table header 502 followed by a separator, column label 504 followed by a separator, column label 506 followed by a separator, column label 508 followed by a separator, column label 510 followed by a separator, column label 512 followed by a separator, cell 514 followed by a separator, cell 516 followed by a separator, cell 518 followed by a separator, cell 520 followed by a separator, cell 522 followed by a separator, followed by more cells and separators corresponding to the subsequent rows of information content in table 500. In some embodiments, the CSV format indicates transitions between the table header, the column labels, and each row of information content. This may be accomplished by using a different type of separator (e.g., a semicolon instead of a comma) as the separator after the table header, the last column label, and the last cell in each row of information content. Such a format preserves row demarcation information in table structures.

At 404, data and label components in the layout form are identified. Data components refer to information items (not labels) that may be unique and are not necessarily repeated. Label components (e.g., column labels) refer to elements that are applicable (e.g., descriptive of) multiple other values (e.g., multiple cells beneath a label, for which each such cell belongs to a category described by the label). With respect to the example of FIG. 5, table header 502 and column labels 504, 506, 508, 510, and 512 are label components. Cells 514, 516, 518, 520, and 522 are data components. In the example of FIG. 5, all cells beneath cells 514, 516, 518, 520, and 522 are also data components. In terms of the content of table 500 of FIG. 5 in the CSV format described above, the first six values (corresponding to table header 502 and column labels 504, 506, 508, 510, and 512) are label components, and the rest of the values are data components. In some embodiments, data and label components are identified according to a rules-based approach. For example, a rule may designate that a first value is a table header, the next row of values are column labels, and subsequent rows are data components.

In some embodiments, at least some label components are identified using a machine learning model. For example, a machine learning model can be trained to perform the specific task of identifying the table header. The machine learning model can be trained on examples with various different types of table headers. A separate model to identify table headers may be needed because a rules-based approach may not be flexible enough to identify table headers in complex settings, e.g., multi-line headers. Similarly, another machine learning model can be trained to perform the specific task of identifying column labels. After the table header and column labels are identified, the remaining components can be designated as data components. In some embodiments, column labels are standardized into an enumerated list of fields, such as a specified list of entities. For example, with respect to the example of software contracts, each column label can be determined to be one of the following entities: product, publisher part number, publisher, version, edition, platform, language, agreement type, license type, purchased rights, unit cost currency, unit cost, metric group, license metric, license duration, rights per license pack, number of packs, start date, end date, named user type, database option, purchase order number, asset tag, owned by, company, location, vendor, general ledger account, cost center, department, and contract number. Any label component can be matched to one these entities by computing a distance between the label component and each of the entities and selecting the entity whose distance is closest to the label component. An example of a distance metric that can be computed and compared is Levenshtein distance. Other metrics that measures the difference between two sequences, e.g., to determine a minimum number of single-character edits (insertions, deletions or substitutions) required to change one word into the other can also be used.

At 406, text sequences comprised of the identified data and label components are constructed. In some embodiments, each row of information in a table is converted to one or more text sentences. For example, in the example shown in FIG. 5, text 524 corresponds to the first information row of table 500 and could be: "Product is SoftwareABC. Unit cost is $100. License duration is 12 months. Location is USA. Department is Marketing." if column labels 504, 506, 508, 510, and 512 are Product, Unit cost, License duration, Location, and Department, respectively and cells 514, 516, 518, 520, 522 are SoftwareABC, $100, 12 months, USA, and Marketing, respectively.

FIG. 5 is a diagram illustrating an example of converting table content segments to intermediate representations. FIG. 5 is described in detail above in the description associated with FIG. 4.

Figure 6:
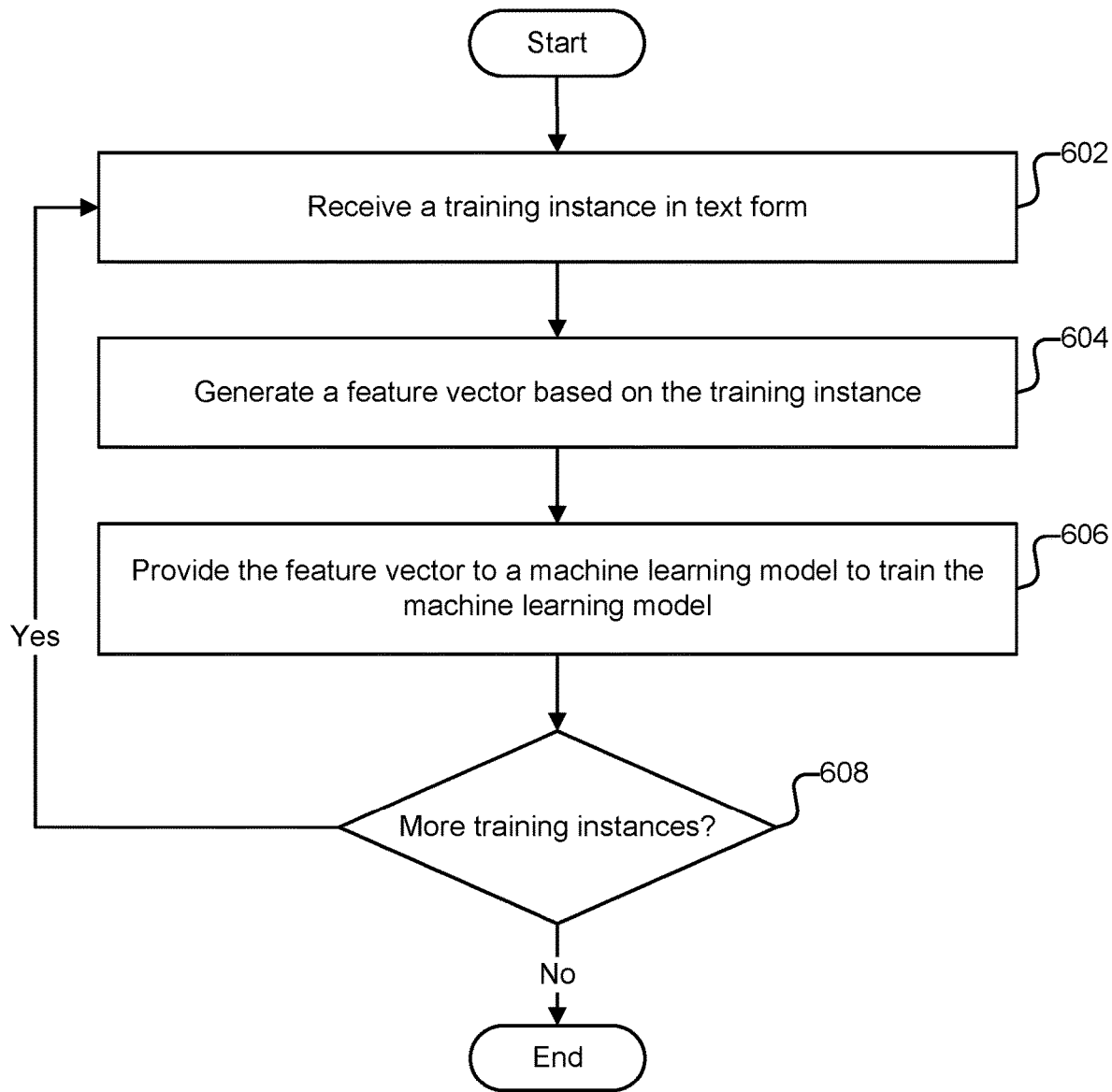
FIG. 6 is a flow chart illustrating an embodiment of a process for providing training instances to a machine learning model.

FIG. 6 is a flow chart illustrating an embodiment of a process for providing training instances to a machine learning model. In some embodiments, the process of FIG. 6 is performed by model training 110 of FIG. 1. In some embodiments, the machine learning model extracts information of interest in a document at 208 of FIG. 2.

At 602, a training instance in text form is received. For table structure training, in some embodiments, the training instance is in the intermediate text representation format at 206 of FIG. 2. In some embodiments, the training instance is text 524 of FIG. 5. With respect to software contracts, in some embodiments, software license information within table structures is preprocessed using the information stored in column labels (also referred to as column headers). For example, column headers can be standardized into an enumerated list of entities, which has the benefit of improving training efficiency (due to less data needed for training) and improving model robustness (due to the model being constrained with respect to the number of entities a word can belong to).

At 604, a feature vector based on the training instance is generated. In some embodiments, the feature vector for the training instance includes words, prefixes of the words, suffixes of the words, and data types of the words. In some embodiments, words are embedded in another layer in which sequences of words are formed. This is advantageous for entities that span multiple words, such as some product names. It is also possible to construct a model layer that captures intra-word structure (e.g., segmenting within words). This is advantageous for entities that follow a specified intra-word format. For, example, "Office", "Pro", and "Plus" are intra-word segments of the product name "OfficeProPlus". In some embodiments, intra-word segmentation is linked to specific publishers whose products have specific intra-word formats. In some embodiments, additional information is added to the feature vector. For example, a publisher name can be added, which in the context of software contracts, can make training more effective when certain publishers are strongly associated with certain software products. The machine learning model is able to learn nuances associated with publishers because the publisher information is separated out and then used to train the model as a feature. In some embodiments, entities, such as product name, are standardized using RegEx matching (e.g., in particular if specified formats, such as publisher formats, are known).

At 606, the feature vector is provided to the machine learning model to train the machine learning model. When the machine learning model is trained, it is known what the different parts of the training instance are. For example, it is known that a first column is the product name, a second column is the part number, a third column is the price, etc. In this manner, this information can be used during training. Different tables can have information in different orders. In various embodiments, the machine learning model is trained using data derived from various table formats so that the machine learning model can extract entities regardless of the specific format of each table. Various table formats are converted to a single intermediate form so that all table examples can be used to train a single model. The advantage of this intermediate form is that it allows more efficient training of the model. The machine learning model is trained on datasets comprising a constrained set of objects associated with one or more prescribed entity types (also referred to as field types) to which the extracted information of interest belongs. The objects comprising the datasets are feature vectors as described above. Words comprising the feature vectors are extracted. These words are associated with (e.g., can be classified into) prescribed entity/field types. In various embodiments, the entity/field types are the various entities described herein that can be identified (e.g., product, publisher part number, publisher, version, edition, platform, language, agreement type, license type, purchased rights, unit cost currency, unit cost, metric group, license metric, license duration, rights per license pack, number of packs, start date, end date, named user type, database option, purchase order number, asset tag, owned by, company, location, vendor, general ledger account, cost center, department, and contract number).

At 608, it is determined whether more training instances are available. If it is determined at 608 that more training instances are available, at 602, another training instance is received to continue model training. If it is determined at 608 that no more training instances are available, no further action is taken.

A similar process takes place for training based on text blocks. In some embodiments, each paragraph/block is a training instance. In the software contracts context, oftentimes, only a few entities are extracted from text blocks (e.g., publisher name) and the rest are extracted from table structures. Thus, a machine learning model may be trained to extract a specified small group of entities from text blocks (e.g., paragraphs).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
 receiving a document;
 analyzing the document to discover text and structures of content included in the document;
 using a result of the analysis to determine intermediate text representations of segments of the content included in the document, wherein at least one of the intermediate text representations includes an added text encoding the discovered structure of the corresponding content segment within a structural layout of the document;
 using the intermediate text representations as an input to a machine learning model to extract information of interest in the document; and
 creating one or more structured records of the extracted information of interest.

2. The method of claim 1, wherein the document is a legal document.

3. The method of claim 2, wherein the legal document is a contract for transfer of software rights.

4. The method of claim 1, wherein analyzing the document includes determining a document type and performing processing specific to the document type associated with preparing the document for discovery of text and table structures.

5. The method of claim 4, wherein the processing associated with preparing the document for discovery of text and table structures includes converting text in images to a format that is readable and searchable by a computer.

6. The method of claim 1, wherein analyzing the document includes utilizing an additional machine learning model to determine table boundary coordinates within the document.

7. The method of claim 6, wherein the additional machine learning model is a fast region-based convolutional neural network (Fast R-CNN).

8. The method of claim 1, wherein analyzing the document includes determining whether a discovered table includes relevant content.

9. The method of claim 8, wherein determining whether the discovered table includes relevant content includes detecting text associated with a specified list of words pertaining to software licensing.

10. The method of claim 1, wherein the intermediate text representations are converted from prior text representations that include content values that are separated by separator characters.

11. The method of claim 1, wherein the intermediate text representations are generated at least in part by combining label components and non-label components, extracted from prior text representations, into one or more natural language sentences.

12. The method of claim 1, wherein the added text encoding the discovered structure of the corresponding content segment within the structural layout of the document comprises a table column label.

13. The method of claim 1, wherein the machine learning model is a named-entity recognition (NER) model.

14. The method of claim 1, wherein the machine learning model utilizes feature vectors comprising natural language words derived from the intermediate text representations.

15. The method of claim 1, wherein the machine learning model is trained on datasets comprising a constrained set of objects associated with one or more prescribed entity types to which the extracted information of interest belongs.

16. The method of claim 1, wherein the extracted information of interest comprises a software product name.

17. The method of claim 1, wherein the document is in a file format that has captured elements of a printed document as an electronic image that a user can view, navigate, print, and send to another user.

18. The method of claim 1, wherein the one or more structured records are stored in a software asset management (SAM) database.

19. A system, comprising:
 one or more processors configured to:
  receive a document;
  analyze the document to discover text and structures of content included in the document;
  use a result of the analysis to determine intermediate text representations of segments of the content included in the document, wherein at least one of the intermediate text representations includes an added text encoding the discovered structure of the corresponding content segment within a structural layout of the document;
  use the intermediate text representations as an input to a machine learning model to extract information of interest in the document; and
  create one or more structured records of the extracted information of interest; and
 a memory coupled to at least one of the one or more processors and configured to provide at least one of the one or more processors with instructions.

20. A computer program product embodied in a non-transitory computer readable medium and comprising computer instructions for:
 receiving a document;
 analyzing the document to discover text and structures of content included in the document;
 using a result of the analysis to determine intermediate text representations of segments of the content included in the document, wherein at least one of the intermediate text representations includes an added text encoding the discovered structure of the corresponding content segment within a structural layout of the document;
 using the intermediate text representations as an input to a machine learning model to extract information of interest in the document; and creating one or more structured records of the extracted information of interest.

\* \* \* \* \*